United States Patent Office 2,818,446
Patented Dec. 31, 1957

2,818,446

STABILIZATION OF CHLORINATED HYDROCARBONS

Fred W. Starks, Tonawanda, N. Y., assignor to E. I. du Pont de Nemours and Company, Wilmington, Del., a corporation of Delaware No Drawing. Application October 25, 1956
Serial No. 618,181

10 Claims. (Cl. 260—652.5)

This application, a continuation-in-part of my copending application S. N. 459,211, filed September 29, 1954, now U. S. Patent No. 2,788,309, relates to the stabilization of chlorinated hydrocarbon degreasing solvents. In particular, it relates to the stabilization of trichlorethylene against metal catalyzed decomposition.

Among the several types of decomposition to which chlorinated hydrocarbon degreasing solvents, particularly trichlorethylene, are subject, is the condensation catalyzed by metals, or more probably, by the metal chlorides formed on interaction between metals and these chlorinated hydrocarbons. This condensation, which results in the formation of black tars and the liberation of hydrogen chloride, is extremely disadvantageous when trichlorethylene is used to degrease metals. Solvent is lost, tar is deposited on the articles being degreased and the hydrogen chloride evolved may etch the metal. Aluminum or aluminum chloride is the most effective catalyst for the decomposition but other metals, especially iron, may act in the same manner. Although, as previously pointed out, the metal chlorides, formed when trichlorethylene is exposed to metals under degreasing conditions, are probably the true catalysts, the decomposition is metal induced and for the purposes of this invention will be referred to as metal catalyzed decomposition.

Various methods have been utilized heretofore to prevent the metal catalyzed decomposition of chlorinated hydrocarbon degreasing solvents. Small quantities of water or alcohol, for example, have been added to trichlorethylene with some success. These additives, however, increase the solubility of hydrogen chloride in the solvent and enhance the difficulties in the control of corrosion. Organic ethers and esters have also been used, in some instances, but their value has not been very great.

A primary object of this invention is consequently provision of a novel and useful method of stabilizing trichlorethylene against metal catalyzed decomposition into tars and hydrogen chloride.

A further object of the invention is provision of trichlorethylene stabilized by the inclusion therein of small but effective quantities of materials preventing metal-influenced decomposition.

A still further object is provision of a method of preventing the catalyzed decomposition of trichlorethylene during the degreasing of metals such as aluminum and iron.

The above-mentioned and additional objects are achieved in accordance with this invention by supplying to the trichlorethylene a small amount of a synergistically cooperative pair of additives consisting of an epoxide and an ester. Neither of these additives is particularly efficacious when utilized alone but in combination the individual value of each is enhanced several fold.

The epoxides of this invention contain the structural configuration:

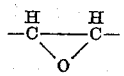

where the two carbon atoms shown are part of an aliphatic carbon chain. The most desirable compounds are those possessing relatively short chains in which the total number of carbon atoms in the molecule ranges from 3 to 8. Suitable epoxides include those of propylene, butylene, amylene, cyclohexene and the like. Halogen substituents along the carbon chain are perfectly acceptable. A preferred epoxide of the invention is, in fact, epichlorohyrin or chloropropylene oxide,

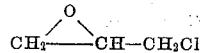

Esters suitable for synergistic combination with the epoxide are those in which low molecular weight monobasic acids are combined with low molecular weight monohydric alcohols. The preferred esters are those in which the carbon chain of neither the alcohol nor the acid exceeds about four atoms in length. Non-substituted chains are preferred in the case of both the acid and the alcohol combined in the particular ester used. The acetates, propionates and butyrates of methyl, ethyl, propyl and butyl alcohols are particularly suitable. Ethyl acetate is the preferred ester of the invention.

The quantity of epoxide added to the trichlorethylene should preferably be close to that of the ester employed but epoxide:ester ratios of between about 1:10 and 10:1 are acceptable. The weight of each additive should be between about 0.1% and 1% of the weight of the solvent employed. Good results may be obtained with about 0.1–0.3% by weight of both the epoxide and the ester. Percentages larger than 1% may be used but they are unnecessary. It will be understood that the weights given vary somewhat with the particular addition agents utilized.

A preferred combination of additives for use with trichlorethylene consists of around 0.2% by weight of ethyl acetate and 0.3% by weight of epichlorohydrin. This particular combination has a stabilizing effect from seven to twenty-fold greater than that of either component used singly.

There follow some examples which disclose the invention in more detail. In these examples all percentages are by weight unless otherwise noted. The numbers of the samples begin anew with each table.

EXAMPLE 1

In a series of runs, separate 50 ml. samples of trichlorethylene were refluxed at ambient pressure in the presence of 0.3–0.35 g. of anhydrous aluminum chloride and 1.0 g. of aluminum chips. The presence of aluminum and of aluminum chloride simulates conditions obtaining in the commercial degreasing of aluminum. The weight of the condensation product or tar formed during equal reflux periods was taken as a measure of the stabilizing effect of the additive. Actual composition of the samples and results obtained are shown in Table I and Table II.

*Table I.—Evaluation of epichlorohydrin-ethyl acetate combination*

| Exp. | Composition | Wt. of Tar Formed Experiment No. | | | Weight Ratios [1] Experiment No. | | |
|---|---|---|---|---|---|---|---|
| | | 1 | 2 | 3 | 1 | 2 | 3 |
| 1 | No additive | 0.2574 | 0.1722 | 0.3336 | 13 | 7.9 | 17 |
| 2 | 0.2% ethyl acetate | 0.1286 | 0.0575 | 0.0992 | 6.5 | 20.8 | 5 |
| 3 | 0.2% ethyl acetate+0.3% epichlorohydrin | 0.0242 | 0.0073 | 0.0156 | 1.0 | 1.0 | 1.0 |
| 4 | 0.3% epichlorohydrin | 0.1790 | 0.1515 | 0.1050 | 9 | 23.9 | 6 |

[1] These ratios represent the weight of tar formed in the particular sample divided by the weight of the tar formed in a sample containing the corresponding synergistic mixture.

*Table II.—Evaluation of epichlorohydrin-ethyl acetate combination*

| Exp. | Composition | Weight of Tar Formed | Weight Ratios [1] |
|---|---|---|---|
| 1 | No additive | 0.1488 | 3.0 |
| 2 | 0.1% ethyl acetate | 0.1416 | 2.8 |
| 3 | 0.1% ethyl acetate+0.15% epichlorohydrin | 0.0528 | 1.0 |
| 4 | 0.15% epichlorohydrin | 0.2428 | 4.8 |

[1] These ratios represent the weight of tar formed in the particular sample divided by the weight of the tar formed in a sample containing the corresponding synergistic mixture.

EXAMPLE 2

The speed at which trichlorethylene decomposed in the presence of aluminum chloride may also be determined by measuring the rate of decreasing light transmittance therethrough. Accordingly, a second series of runs was made in which the time required for the solvent to become opaque because of the formation of tar was determined. The runs were in other respects conducted as were those of Example 1. Composition of the samples and results are shown in Tables III, IV and V.

*Table III.—Opacity in samples containing 0.2% ester— 0.3% epoxide*

| Exp. | Composition | Time for Polymer to Form at Reflux Temperature (sec.) |
|---|---|---|
| 1 | No Additive | 2–5 |
| 2 | 0.2% ethyl acetate | 45 |
| 3 | 0.10% ethyl acetate+0.15% epichlorohydrin | 120 |
| 4 | 0.30% epichlorohydrin | 2–5 |

[1] The quantities of the respective reagents were cut in half in the synergistic mixture but still gave much improved results in the mixture.

*Table IV.—Opacity in preferred sample*

| Exp. | Composition | Time for Polymer to Form (sec.) |
|---|---|---|
| 1 | No Additive | 2–5 |
| 2 | 0.2% ethyl acetate | 180 |
| 3 | 0.2% ethyl acetate+0.3% epichlorohydrin | 1,200 |
| 4 | 0.3% epichlorohydrin | 2–5 |

*Table V.—Opacity in samples containing 0.1% ester— 0.15% epoxide*

| Exp. | Composition | Time for Polymer to Form (sec.) |
|---|---|---|
| 1 | No Additive | 2–5 |
| 2 | 0.10% ethyl acetate | 2–5 |
| 3 | 0.10% ethyl acetate+0.15% epichlorohydrin | 120–160 |
| 4 | 0.15% epichlorohydrin | 2–5 |

EXAMPLE 3

Various concentrations of the esters, methyl propionate and methyl acrylate, and the epoxides, butylene oxide and epichlorohydrin, were refluxed alone and in combination in 50 ml. samples of trichlorethylene containing approximately 0.3 g. aluminum chloride for 15 minutes. The percentage of light transmission at the end of this time was then determined with a Fisher electrophotometer. The reduction of percent light transmission is a measure of the development of colored bodies in the chlorinated hydrocarbon solvent. These experiments are summarized in Table VI.

*Table VI.—Evaluation of synergistic ester-epoxide stabilizer pairs*

| Exp. | Ester | | Epoxide | | Percent Transmitted Light After Refluxing |
|---|---|---|---|---|---|
| | Name | Conc. In Wt. Percent | Name | Conc. In Wt. Percent | |
| A1 | Methyl Propionate | 0.2 | | | 28 |
| A2 | | | Butylene Oxide | 0.3 | <10 |
| A3 | Methyl Propionate | 0.2 | do | 0.3 | 74 |
| B1 | do | 0.2 | | | 37 |
| B2 | | | Epichlorohydrin | 0.3 | 15 |
| B3 | Methyl Propionate | 0.2 | do | 0.3 | 76 |
| C1 | Methyl Acrylate | 0.2 | | | 18 |
| C2 | | | Butylene Oxide | 0.3 | 12 |
| C3 | Methyl Acrylate | 0.2 | do | 0.3 | 68 |
| D1 | do | 0.1 | | | 10 |
| D2 | | | Butylene Oxide | 0.15 | <10 |
| D3 | Methyl Acrylate | 0.1 | do | 0.15 | 57 |

Control experiments with 50 ml. samples of trichlorethylene containing no additives yielded a colored solvent whose light transmission was zero. The above tables demonstrate that both esters and epoxides give solutions that transmit some light but that in combination these agents cooperate to give a high percentage transmission.

EXAMPLE 4

An additional series of esters and epoxides was tested following the procedure of Example 3. However, in this series duplicate experiments were carried out in each instance. Accordingly, two light transmission values are given for the comparative tests in Table VII which summarizes these experiments.

Table VII.—Evaluation of synergistic ester-epoxide stabilizer pairs

| Exp. | Ester Name | Ester Conc. In Wt. Percent | Epoxide Name | Epoxide Conc. In Wt. Percent | Percent Transmitted Light After Refluxing |
|---|---|---|---|---|---|
| A1 | Ethyl Formate. | 0.084 | | | 22, 14 |
| A2 | | | Butylene Oxide. | 0.12 | <10, <10 |
| A3 | Ethyl Formate. | 0.084 | do | 0.12 | 67, 64 |
| B1 | Ethyl Butyrate. | 0.132 | | | 34, 47 |
| B2 | | | Butylene Oxide. | 0.12 | <10, <10 |
| B3 | Ethyl Butyrate. | 0.132 | do | 0.12 | 75, 74 |
| C1 | Butyl Acetate. | 0.13 | | | 54, 55 |
| C2 | | | Butylene Oxide. | 0.12 | <10, <10 |
| C3 | Butyl Acetate. | 0.13 | do | 0.12 | 80, 80 |
| D1 | Isopropyl Acetate. | 0.12 | | | <10, <10 |
| D2 | | | Butylene Oxide. | 0.12 | <10, <10 |
| D3 | Isopropyl Acetate. | 0.12 | do | 0.12 | 57, 66 |
| E1 | Ethyl Acetate. | 0.07 | | | 14, <10 |
| E2 | | | Octylene Oxide. | 0.22 | <10, 18 |
| E3 | Ethyl Acetate. | 0.07 | do | 0.22 | 57, 66 |
| F1 | do | 0.07 | | | 25, 18 |
| F2 | | | Propylene Oxide. | 0.09 | 10, <10 |
| F3 | Ethyl Acetate. | 0.07 | do | 0.09 | 82, 75 |
| G1 | do | 0.07 | | | <10, <10 |
| G2 | | | Diisobutylene Oxide. | 0.11 | <10, <10 |
| G3 | Ethyl Acetate. | 0.07 | do | 0.11 | 76, 73 |
| H1 | do | 0.07 | | | 12, <10 |
| H2 | | | Cyclohexene Oxide. | 0.11 | <10, <10 |
| H3 | Ethyl Acetate. | 0.07 | do | 0.11 | 42, 36 |

It may be noted that the ester-epoxide synergism of this invention is not appreciably affected by certain other additives included in trichlorethylene. Thus, for example, antioxidants such as para-tertiary amyl phenol, can be included along with an ester and an epoxide in a single sample of the solvent.

Other variations in the exemplified aspects of this invention can be made without departing from the spirit thereof. More than one ester can, for example, be used in the same sample of trichlorethylene together with a single epoxide. Alternatively, two epoxides can be combined with one ester or even two or more esters.

Having now described my invention, I claim:

1. The method of stabilizing trichlorethylene against decomposition catalyzed by metals which comprises supplying to said solvent a synergistically cooperative pair of additives consisting of (1) an epoxide containing the structural configuration,

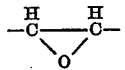

and a total of 3 to 8 carbon atoms, selected from the group consisting of unsubstituted aliphatic hydrocarbon epoxides and aliphatic hydrocarbon epoxides containing substituent halogen atoms, and (2) an unsubstituted aliphatic ester derived from a carboxylic acid containing not more than 4 carbon atoms and an alcohol containing not more than 4 carbon atoms, each of said synergistically cooperative additives being present to the extent of between about 0.1 and 1% of the weight of said trichlorethylene.

2. The method of claim 1 in which each of the synergistically cooperative additives are present to the extent of 0.1 to 0.3% of the trichlorethylene.

3. The method of claim 2 in which the epoxide is epichlorohydrin and the ester is ethyl acetate.

4. The method of claim 2 in which the epoxide is butylene oxide and the ester is ethyl acetate.

5. A composition of matter comprising trichlorethylene containing a pair of additives consisting of (1) an epoxide containing the structural configuration,

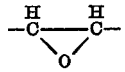

and a total of 3 to 8 carbon atoms, selected from the group consisting of unsubstituted aliphatic hydrocarbon epoxides and aliphatic hydrocarbon epoxides containing substituent halogen atoms, and (2) an unsubstituted aliphatic ester derived from a carboxylic acid containing not more than 4 carbon atoms and an alcohol containing not more than 4 carbon atoms, each of said additives being present to the extent of between about 0.1 and 1% of the weight of said trichlorethylene.

6. The composition of claim 5 in which each of the additives are present to the extent of 0.1 to 0.3% of the trichlorethylene.

7. The composition of claim 5 in which the epoxide is epichlorohydrin and the ester is ethyl acetate.

8. The composition of claim 5 in which the epoxide is butylene oxide and the ester is ethyl acetate.

9. The composition of claim 5 in which the epoxide is cyclohexene oxide and the ester is ethyl acetate.

10. A composition of matter comprising trichlorethylene containing a pair of additives consisting of (1) an epoxide containing the structural configuration,

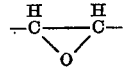

and a total of 3 to 8 carbon atoms, selected from the group consisting of unsubstituted aliphatic hydrocarbon epoxides and aliphatic epoxides containing substituent halogen atoms, and (2) an unsubstituted aliphatic ester derived from a carboxylic acid containing not more than 4 carbon atoms and an alcohol containing not more than 4 carbon atoms, each of said additives being present in small amounts to the extent of at least about 0.1% of the weight of said trichlorethylene.

References Cited in the file of this patent

UNITED STATES PATENTS

| | | |
|---|---|---|
| 2,371,645 | Aitchison et al. | Mar. 20, 1945 |
| 2,371,647 | Petering et al. | Mar. 20, 1945 |

U. S. DEPARTMENT OF COMMERCE
PATENT OFFICE

CERTIFICATE OF CORRECTION

Patent No. 2,818,446                        December 31, 1957

Fred W. Starks

It is hereby certified that error appears in the printed specification of the above numbered patent requiring correction and that the said Letters Patent should read as corrected below.

Column 1, line 17, strike out "now U. S. Patent No. 2,788,309,".

Signed and sealed this 4th day of March 1958.

(SEAL)
Attest:
KARL H. AXLINE
Attesting Officer

ROBERT C. WATSON
Commissioner of Patents